F. A. HOYA.
TIRE TREAD ATTACHMENT.
APPLICATION FILED AUG. 1, 1919.
1,357,322. Patented Nov. 2, 1920.
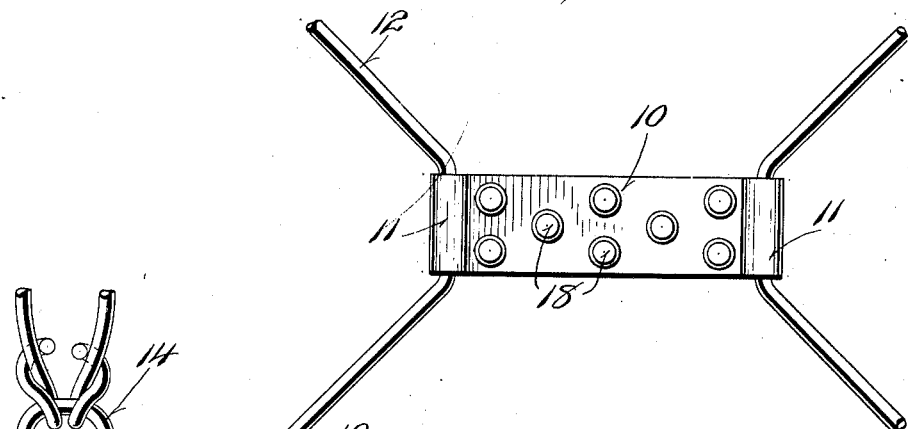
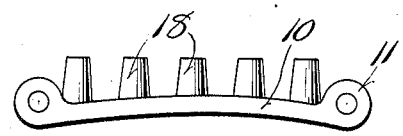
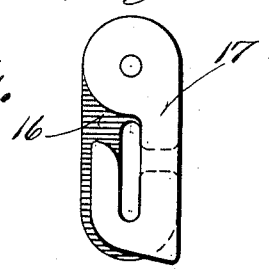
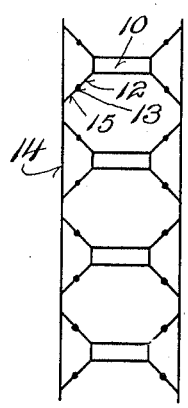
Witness
J. F. Britt
Inventor
F. A. Hoya
Young & Young
Attorneys

UNITED STATES PATENT OFFICE.

FERDINAND A. HOYA, OF MILWAUKEE, WISCONSIN.

TIRE-TREAD ATTACHMENT.

1,357,322.   Specification of Letters Patent.   Patented Nov. 2, 1920.

Application filed August 1, 1919. Serial No. 314,668.

*To all whom it may concern:*

Be it known that I, FERDINAND A. HOYA, a citizen of the United States, and resident of Milwaukee, in the county of Milwaukee and State of Wisconsin, have invented certain new and useful Improvements in Tire-Tread Attachments; and I do hereby declare that the following is a full, clear, and exact description thereof.

My invention relates to new and useful improvements in anti-skid devices of that type comprising anti-skid members adapted to be retained in place on the tread portion of the tire by side chain lengths extending around the tire.

It is in general the object of my invention to simplify and otherwise improve the structure and to increase the efficiency of devices of this character.

More particularly, it is an important object of my invention to provide an arrangement whereby those members of the device which receive and transmit the tread stresses to the tire may be formed of flat metal sections instead of chains, and may be held against movement on the tire to reduce wear upon the tire by the engagement of the device therewith.

With the above and other objects and advantages in view, which will be apparent as the description proceeds, my invention resides in the novel features of construction, combination and arrangement of parts which will be hereinafter more particularly described and defined by the appended claim.

In the accompanying drawings:

Figure 1 is a plan view of portions of a tire tread attachment embodying my invention.

Fig. 2 is a side elevational view of one of the tread members of the device.

Fig. 3 is a side elevational view of one of the connecting hooks for the side chains, and Fig. 4 is a diagrammatic view showing the relation of tread parts and connecting parts in my device.

Referring now more particularly to the drawings, my improved tread attachment includes a series of tread members each formed of a flat preferably metallic gripping plate 10 which is elongated and slightly curved to engage the central portion of the tread surface of the tire, said plate being provided with sleevelike ears 11 at its ends adapted to receive the straight intermediate stretches of a pair of connecting wires 12, the end portions of each wire 12 extending divergently and terminating in a connecting eye 13. By this arrangement, it will be seen that the divergent stretches of the wire constitute link members which are in alinement with the pull or strain, and due to the bending of these link members at the corners of the plates, the said plates are held against longitudinal play. A pair of guide chains 14 are provided for disposition around the sides of the tires, the links of these chains being of any desired nature and being formed of bent wire in the present instance, and the V-wires 12 are connected with these side chains by links 15 engaged in the terminal eyes 13 of said V-wires and extending in the lines of divergence of the legs of said V-wires. The ends of the side chains 14 are detachably connected together by safety-hook devices each comprising a pair of hook members 16 and 17 having their shanks pivoted to one end of the respective side chains, the bill of each hook overlapping the shank of the other hook whereby to procure a positive lock for the chain length inserted in the bills.

An exceedingly simple arrangement has thus been provided whereby the tread members may be firmly mounted on the tread portion of a tire and held against movement in any direction by wire stretches extending diagonally from the corners of the tread members to the side chains 14, as clearly indicated in the diagrammatic Fig. 4.

The tread members 10 are each provided with a plurality of outstanding lugs 18. The ends of said lugs lie in a single plane, in contrast to the longitudinal curvature of the tread member, although other gripping means may be afforded for said tread members, and it will be appreciated that various changes and modifications of structure may be employed to meet differing conditions of use and manufacture without departing in any manner from the spirit of my invention.

What is claimed is:

A tire tread attachment comprising a series of transversely disposed gripping plates, each being formed with longitudinally disposed aperture ears merging into the plate body, stirrup wires having stretches extending through the ear apertures, the ends of the straight stretches being bent outwardly at the ends of the plate ears to form diverging link stretches in alinement with the draw strain of the attachment, and whereby the gripping plate is held against longitudinal play between said diverging link stretches, and link attaching means at the ends of the aforesaid link stretches.

In testimony that I claim the foregoing I have hereunto set my hand at Milwaukee, in the county of Milwaukee and State of Wisconsin.

FERDINAND A. HOYA.